106. COMPOSITIONS, COATING OR PLASTIC.

Patented May 23, 1933

1,910,468

UNITED STATES PATENT OFFICE

OTTO HERTING, OF PHILADELPHIA, PENNSYLVANIA, ASSIGNOR TO PURITY FIBRE PRODUCTS CORPORATION, OF PHILADELPHIA, PENNSYLVANIA, A CORPORATION OF PENNSYLVANIA

COOKING UTENSIL

No Drawing.    Application filed August 5, 1931.   Serial No. 555,368.

This invention relates to an improvement in cooking utensils and more particularly relates to the provision of a cooking utensil formed from fibrous material and adapted for use in the cooking and serving of various forms of pie, such as fruit pies, meat pies, etc., of fish, of meats, vegetables, puddings, etc.

The utensil in accordance with this invention, formed from fibre, or fibrous material, is rendered heat resistant and coated interiorly with an enamel, which may, if desired, be overcoated with wax.

The utensil in accordance with this invention is inexpensive to produce, serviceable and in use presents numerous advantages, chief among which is that it may be used in connection with serving as well as with cooking and that due to its low initial cost, it may be destroyed after a single use.

The utensil in accordance with this invention may be formed from any desirable type of fibrous material, as for example, craftboard, or other fibre board of suitable weight and desirably possessive of substantial porosity. The fibrous material of which the utensil is formed is treated to render it resistant to heat and is desirably treated with a material which will render it heat resistant and which, at the same time, is water insoluble and will not exude from the fibrous material at cooking temperatures. The fibrous material is desirably treated to render it heat resistant prior to its formation into a utensil of desired shape. After the utensil of desired shape is formed, the interior surface is coated with an enamel and, as has been indicated, may also be coated with wax. If desired, the outside as well as the interior surface of the utensil may be coated with enamel.

By way of illustrating a satisfactory procedure for the production of a utensil in accordance with this invention, a fibrous material, as for example, craftboard, is impregnated with, for example, titanium silicate, or by treatment with a solution containing, for example:

Sodium sulphat_____ 70 pounds
Borax_____ 45 pounds
Sodium silicate solution_____ 120 gallons
   (40° Bé.)
Water_____ to make 300 gallons After treatment the craftboard is permitted to substantially dry out then formed, as with a die, to the desired shape and finally dried. When the utensil is finally dried the interior surface is coated with an enamel comprising essentially titanium dioxide, preferably purified, and with which is mixed sodium silicate solution or such emulsified with a vegetable binder, as mucilage or gum arabic, tragacanth, dextrine or carragheen moss, or the like. The enamel may desirably include a pigment, as for example, tricalcium phosphate, or precipitated calcium phosphate, calcium carbonate, barium sulphate c. p., magnesium oxide, magnesium carbonate and silicate, ochre, iron oxide, or the like, depending upon the color desired. The enamel may be applied to the utensil with a brush or by spraying. After the enamel is applied, it is allowed to dry and desirably overcoated with wax, as a high melting point paraffine wax, or a wax mixture consisting, for example, of a high melting point paraffine wax admixed with about 6-10% of carnauba wax. The wax is desirably applied by spraying.

In rendering the fibrous material heat resistant in lieu of the treatment above outlined, the material may be treated successively with solutions containing different substances with a view to producing the desired substance for impregnation of the material within the material by chemical action. For example, the material may be saturated with a solution according to the following formula:

Solution A

| | |
|---|---|
| Aluminum sulphate | 8 oz. |
| Titanium sulphate | ½ oz. |
| Water | 1 gallon |

After partial drying of the material, it is again saturated in a solution according to the following formula:

Solution B

| | |
|---|---|
| Sodium sulphate | 10 pounds |
| Sodium tetraborate (borax) | 5 pounds |
| Silicate of soda solution | 14 gallons |
| Water | 28 gallons |

On saturation with solution B a reaction will take place between the aluminum and titanium sulphates of solution A and the silicate of soda of solution B, with the formation of aluminum titanium silicate in the material treated. The action may be facilitated by heating solution B to a temperature within about the range 140° F.–180° F. After saturation with the solution B, the material is substantially dried and formed into a utensil.

As a more specific illustration of a desirable enamel for the coating of the utensil previously treated to render it heat resistant, a composition having the following formula will be found to be satisfactory:

| | |
|---|---|
| Titanium dioxide | 1 part |
| Tricalcium phosphate | 1 part |
| Sodium silicate solution | 3 parts (42° Bé.) |
| Mucilage | 2 parts |
| Water | 5 parts |

In preparing the enamel according to the above formula a sodium silicate solution and mucilage, or other vegetable binder, as indicated, are agitated together for the formation of an emulsion to which is added the titanium dioxide, and a pigment if used (or the equivalent pigment, as indicated).

As an alternative formula there may be cited the following:

| | |
|---|---|
| Titanium dioxide | 1 part |
| Tricalcium phosphate | 1 part |
| Potato starch | 1 part |
| Glucose | 1 part |
| Gelatine solution | 3 parts (10% solution in formic acid) |
| Water | 5 parts |

In this case also, the starch, glucose, gelatine and water are mixed and the titanium dioxide and pigment added.

It will be clear that the composition of the vehicle may vary widely, as may also the proportions of pigments, the specific compositions used depending upon the consistency or color desired.

It will now be understood that the utensil in accordance with this invention involves fibrous material having a capacity for absorption and which enables it to be impregnated with a material capable of rendering it resistant to heat at such temperatures as are met with in cooking and which at the same time is desirably of such a character that it will not sweat out or exude from the material at such temperatures and which is water insoluble and will not undergo physical change, that is, become water insoluble.

The fibrous material treated with the material to render it resistant to temperatures such as met with in cooking, in the form of the desired utensil, as a pie plate, pot, pan, etc., is coated on its interior surface with the enamel containing essentially titanium dioxide, with which is associated a sodium silicate solution, or an emulsion of silicate of soda and binder, and with which is desirably also associated a pigment.

The utensil in accordance with this invention is resistant to heat at temperatures met with in cooking, has a surface of a character such as to eliminate adherence of articles of food, as for example, pie crust, and the interior surface may, if desired, be overcoated with wax and desirably with a mixture of wax comprising high melting point paraffine with carnauba wax in amount from say about 6%–10%.

It will be understood that while this invention contemplates more particularly a utensil produced with the use of the various materials and equivalents disclosed therein, there is contemplated as within the scope of this invention various modifications and the use of equivalent substances and such are intended to be included herein.

This application is in part a continuation of my application Serial Number 379,884, filed July 20, 1929.

What I claim and desire to protect by Letters Patent is:

1. A cooking utensil formed from fibrous material and interiorly coated with an enamel containing titanium dioxide.

2. A cooking utensil formed from fibrous material and interiorly coated with an enamel containing titanium dioxide and silicate of soda.

3. A cooking utensil formed from fibrous material and interiorly coated with an enamel containing titanium dioxide, silicate of soda and a vegetable binder.

4. A cooking utensil formed from fibrous material and interiorly coated with an enamel containing titanium dioxide, silicate of soda, tricalcium phosphate and mucilage.

5. A cooking utensil formed from fibrous material impregnated with a water insoluble fireproofing material and interiorly coated with an enamel containing titanium dioxide.

6. A cooking utensil formed from fireproofed fibrous material and interiorly coated with an enamel containing titanium dioxide.

7. A cooking utensil formed from fibrous material and interiorly coated with an enamel containing titanium dioxide and an organic binder.

8. A cooking utensil formed from fibrous material and interiorly coated with an enamel containing titanium dioxide. tricalcium phosphate, and an organic binder.

In testimony of which invention, I have hereunto set my hand, at Philadelphia, Penna., on this 21st day of July, 1931.

OTTO HERTING.